(12) United States Patent
Kamiyama et al.

(10) Patent No.: US 11,554,730 B2
(45) Date of Patent: Jan. 17, 2023

(54) VEHICLE WHEEL

(71) Applicant: HONDA MOTOR CO., LTD., Tokyo (JP)

(72) Inventors: Youichi Kamiyama, Wako (JP); Toshinobu Saito, Wako (JP); Yusuke Osawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 868 days.

(21) Appl. No.: 16/460,731

(22) Filed: Jul. 2, 2019

(65) Prior Publication Data

US 2020/0010029 A1 Jan. 9, 2020

(30) Foreign Application Priority Data

Jul. 9, 2018 (JP) .............................. JP2018-129704

(51) Int. Cl.
- B60R 13/08 (2006.01)
- G10K 11/172 (2006.01)
- B60B 21/12 (2006.01)

(52) U.S. Cl.
CPC .......... B60R 13/0884 (2013.01); B60B 21/12 (2013.01); G10K 11/172 (2013.01); *B60B 2900/133* (2013.01)

(58) Field of Classification Search
CPC ... B60R 13/0884; B60R 21/12; G10K 11/172; B60B 2900/133
USPC .................................................. 301/95.101
See application file for complete search history.

(56) References Cited

U.S. PATENT DOCUMENTS

| | | | |
|---|---|---|---|
| 7,775,095 B2 * | 8/2010 | Yu | B60C 23/0494 73/146 |
| 9,399,372 B2 * | 7/2016 | Kamiyama | B60B 21/12 |
| 11,230,142 B2 * | 1/2022 | Kamiyama | G10K 11/172 |
| 2007/0261774 A1 * | 11/2007 | Re Fiorentin | B60C 7/26 301/95.101 |
| 2008/0277997 A1 | 11/2008 | Kamiyama et al. | |
| 2009/0206294 A1 | 8/2009 | Yu | |
| 2016/0016430 A1 | 1/2016 | Kamiyama | |
| 2020/0009905 A1 * | 1/2020 | Kamiyama | B60B 21/12 |

FOREIGN PATENT DOCUMENTS

| | | |
|---|---|---|
| CN | 104981360 A | 10/2015 |
| JP | 4551422 B2 | 9/2010 |

OTHER PUBLICATIONS

Office Action received in corresponding CN application No. 201910606522.9 dated Aug. 3, 2022 with English translation (13 pages).

* cited by examiner

*Primary Examiner* — Forrest M Phillips
(74) *Attorney, Agent, or Firm* — Rankin, Hill & Clark LLP

(57) ABSTRACT

A vehicle wheel includes: a rim including a well portion with an outer circumferential surface, the well portion having a recessed portion formed on the outer circumferential surface; a sub-air chamber member serving as a Helmholtz resonator; and a joining member including a joining portion disposed in the recessed portion. The sub-air chamber member is attached to the outer circumferential surface of the well portion via the joining member.

4 Claims, 8 Drawing Sheets

VEHICLE WHEEL

CROSS-REFERENCE TO RELATED APPLICATIONS

The present application claims priority under 35 U.S.C. § 119 to Japanese Patent Application No. 2018-129704, filed Jul. 9, 2018, the contents of which are hereby incorporated by reference in their entirety.

BACKGROUND OF THE INVENTION

1. Field of the Invention

The present invention relates to a vehicle wheel.

2. Description of the Related Art

There has been known a wheel including a well portion with an outer circumferential surface and a Helmholtz resonator (sub-air chamber member) that is attached to the outer circumferential surface and cancels air column resonance noises in a tire air chamber (e.g., see Japanese Patent No. 4551422). The sub-air chamber member of the wheel includes a main body portion formed elongated in a wheel circumferential direction and defining a sub-air chamber inside the main body, and a pair of plate-shaped edge portions that are formed on wheel width direction two ends of the main body along a substantially entire length of the main body portion in a longitudinal direction thereof to extend outward in a wheel width direction from the two ends. The wheel includes a pair of groove portions into which end portions of the edge portions of the sub-air chamber member are respectively fitted. The sub-air chamber member is attached to the outer circumferential surface of the well portion by the two edge portions being fitted in the pair of groove portions respectively.

SUMMARY OF THE INVENTION

However, the conventional wheel (e.g., see Japanese Patent No. 4551422) has a problem in that the size of the main body portion in the wheel width direction is limited by the extending edge portions. This causes a further problem in that the conventional wheel cannot secure a large volume of the sub-air chamber formed in the main body portion. In view of these circumstances of the conventional wheel, there has been a demand for a wheel that allows a Helmholtz resonator (sub-air chamber member) to have a larger volume inside the sub-air chamber to provide excellent noise canceling performance.

An object of the present invention is to provide a vehicle wheel that includes a Helmholtz resonator (sub-air chamber member) having a larger sub-air chamber volume than the conventional Helmholtz resonator.

A vehicle wheel of the present invention that solves the abovementioned problem includes: a rim including a well portion with an outer circumferential surface, the well portion having a recessed portion formed on the outer circumferential surface; a sub-air chamber member serving as a Helmholtz resonator; and a joining member including a joining portion disposed in the recessed portion. The sub-air chamber member is attached to the outer circumferential surface of the well portion via the joining member.

The present invention cam provide a vehicle wheel that includes a Helmholtz resonator (sub-air chamber member) having a larger sub-air chamber volume than the conventional Helmholtz resonators.

DETAILED DESCRIPTION OF THE EMBODIMENTS

Next, a vehicle wheel according to an embodiment of the present invention is described in detail with reference to the drawings as needed. In the referenced drawings, "X" indicates a wheel circumferential direction, "Y" indicates a wheel width direction, and "Z" indicates a wheel radial direction.

Hereinafter, a description will be given of an overall configuration of the vehicle wheel. Next, a description will be given of a sub-air chamber member (Helmholtz resonator) and a joining member for attaching the sub-air chamber member to the well portion.

Overall Configuration of Vehicle Wheel

Figure 1:
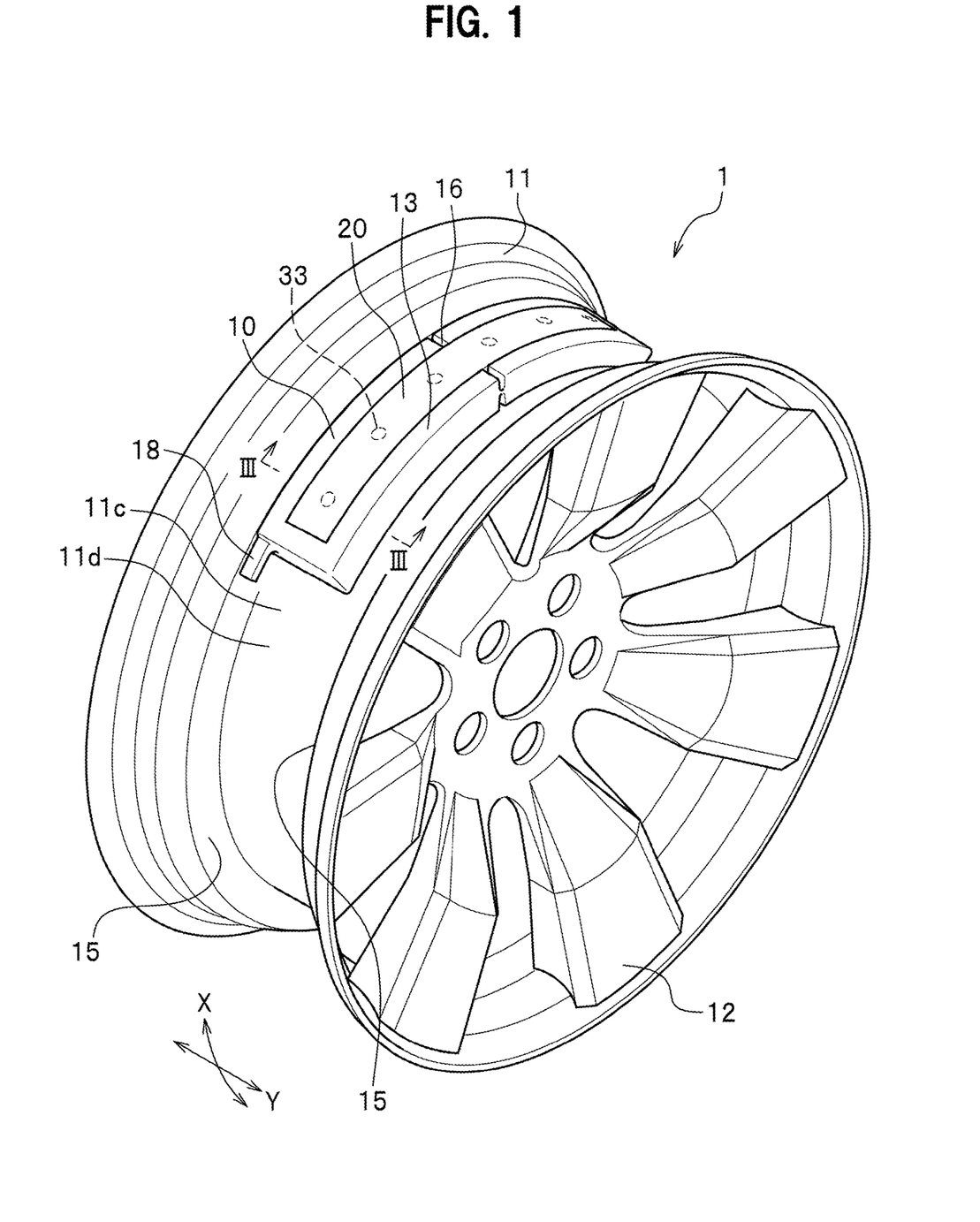
FIG. 1 is a perspective view of a vehicle wheel according to an embodiment of the present invention.

FIG. 1 is a perspective view of a vehicle wheel 1 according to an embodiment of the present invention.

As shown in FIG. 1, the vehicle wheel 1 according to the present embodiment has a rim 11 and a sub-air chamber member 10 (Helmholtz resonator) attached to the rim 11. The rim 11 is made of a metal such as an aluminum alloy or a magnesium alloy. The sub-air chamber member (Helmholtz resonator) is made of a synthetic resin such as polypropylene or polyamide.

In FIG. 1, the reference sign 12 indicates a disc for coupling the rim 11 to a hub not illustrated, and the reference sign 20 indicates a joining member, which is described in detail later, for attaching the sub-air chamber member 10 to the rim 11. The reference sign 33 indicates a bridge of the sub-air chamber member 10 shown by a hidden line (dotted line).

The rim 11 has two end portions that are opposite to each other in the wheel width direction Y, at each of which a bead seat not shown is formed, and has a well portion 11c recessed toward a wheel axis in the wheel radial direction between the bead seats. A bottom surface of this recess defines an outer circumferential surface 11d of the well portion 11c, which has a substantially constant diameter about the wheel axis along the wheel width direction Y.

This rim 11 includes a pair of rising portions 15 that rise toward rim flanges respectively from two ends of the outer circumferential surface 11d of the well portion 11c that are opposite to each other in the wheel width direction Y.

Sub-Air Chamber Member and Joining Member

Next, a description will be given of the sub-air chamber member 10 and the joining member 20.

Figure 2:
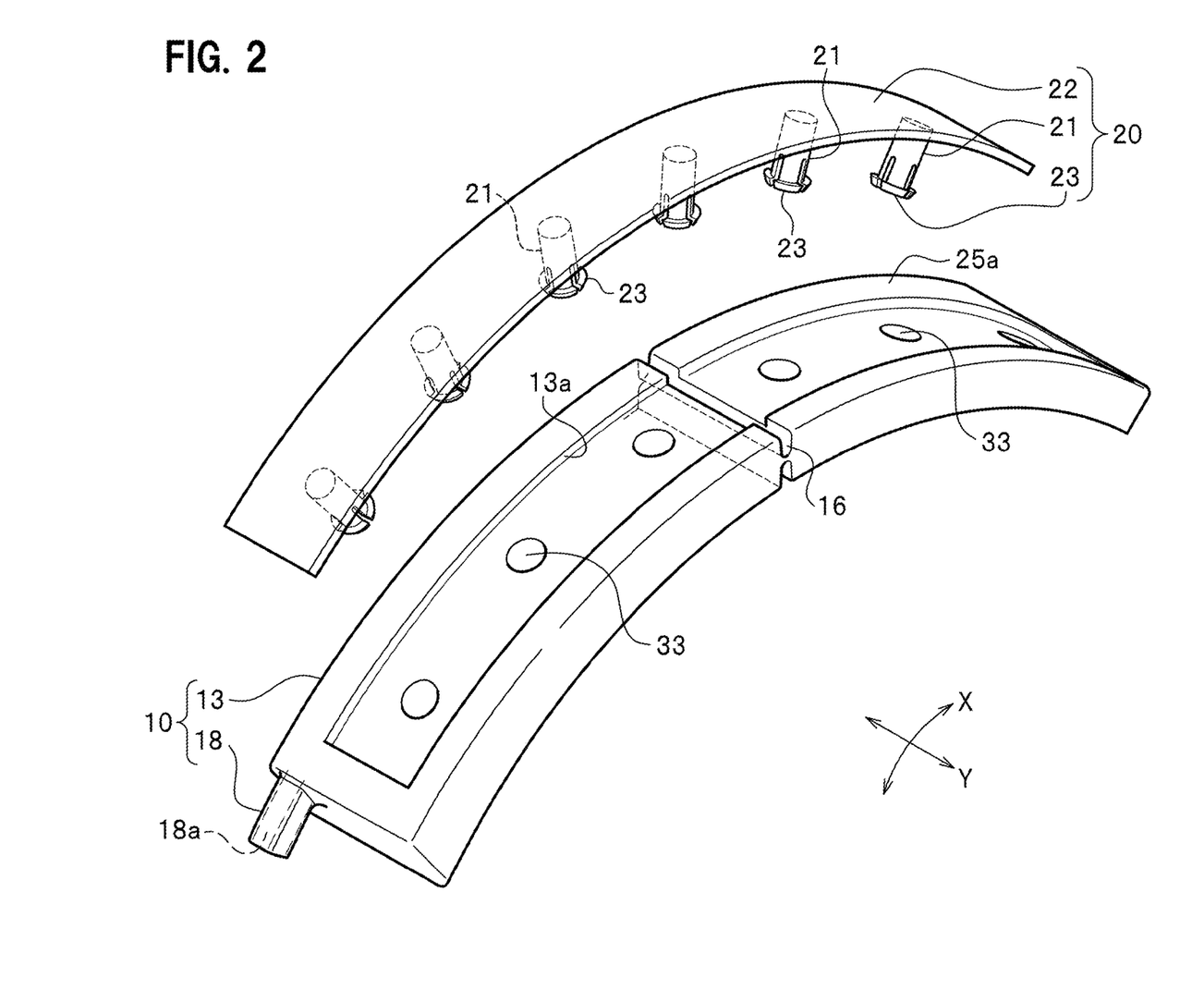
FIG. 2 is a perspective view of a sub-air chamber member and a joining member.
Figure 3:
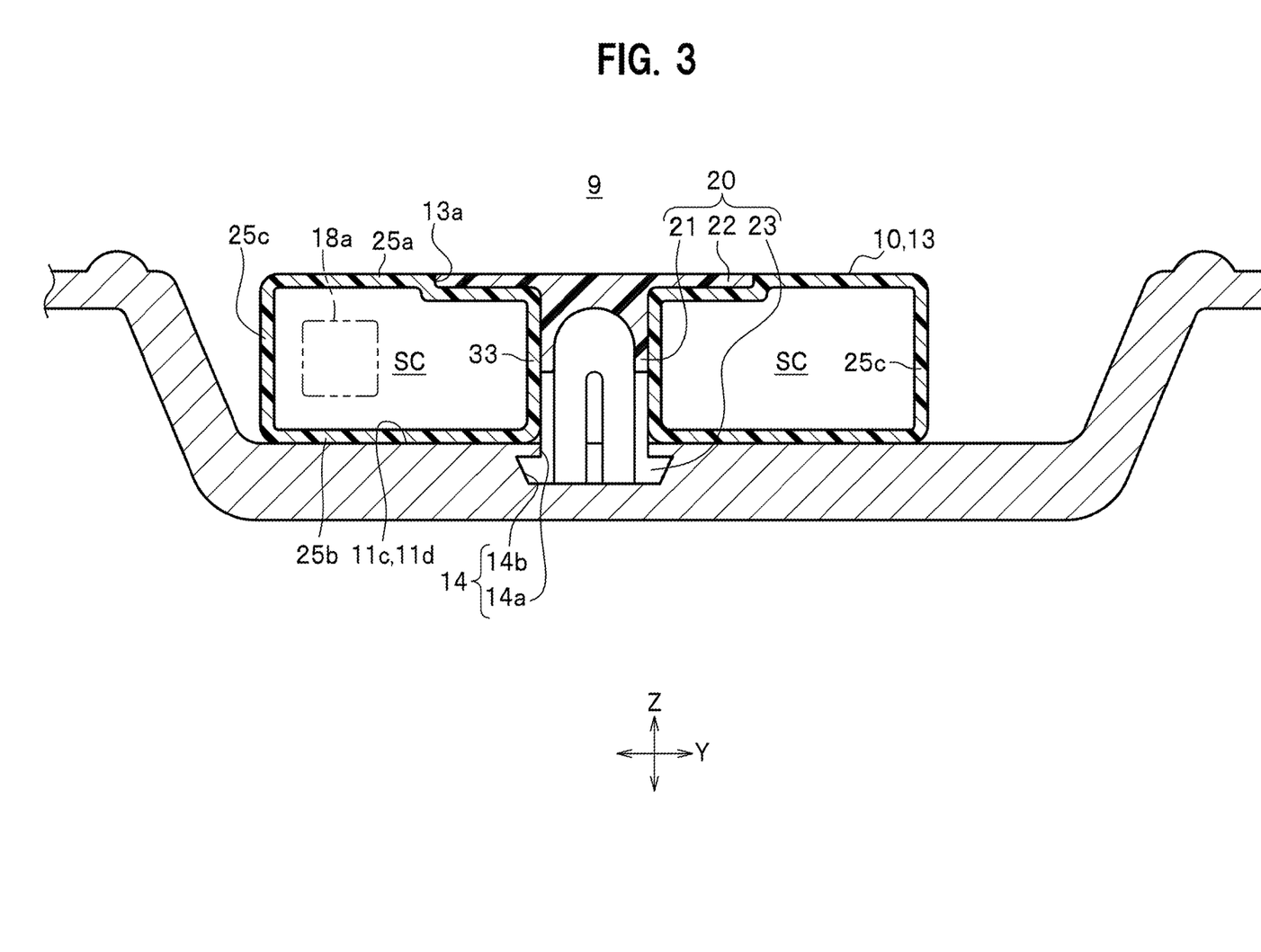
FIG. 3 is a cross-sectional view taken along line in FIG. 1.

FIG. 2 is a perspective view of the sub-air chamber member 10 and the joining member 20. FIG. 3 is a cross-sectional view taken along line in FIG. 1.

Sub-Air Chamber Member

As shown in FIG. 2, the sub-air chamber member 10 is a member which is elongated in one direction and includes a main body portion 13 and tube bodies 18. This sub-air chamber member 10 has a partition wall 16 extending in the wheel width direction Y in the middle of the main body portion 13, and has a shape symmetrical about the partition wall 16 in the wheel circumferential direction X.

The main body portion 13 is longitudinally curved. In other words, the main body portion 13 extends in the wheel circumferential direction X when the sub-air chamber member 10 is attached to the outer circumferential surface 11d of the well portion 11c (see FIG. 1).

The main body portion 13 has a hollow space inside. This hollow space (not illustrated) constitutes a sub-air chamber SC (see FIG. 3) described later. This hollow space is partitioned by the partition wall 16 in the wheel circumferential direction X into two halves.

As shown in FIG. 3, the main body portion 13 has a substantially rectangular shape elongated in the wheel width direction Y in a cross-sectional view orthogonal to the longitudinal direction (wheel circumferential direction X shown in FIG. 2) of the main body portion 13.

Specifically, the main body portion 13 includes a bottom plate 25b that is in contact with the outer circumferential surface 11d of the well portion 11c and extends in the wheel width direction Y, an upper plate 25a that is located opposite the bottom plate 25b above the outer circumferential surface 11d, and a pair of side plates 25c which respectively rise from two ends of the bottom plate 25b that are located opposite each other in the wheel width direction Y and which are joined to the upper plate 25a.

The bottom plate 25b is a plate body that extends substantially flat in the wheel width direction Y. This bottom plate 25b is curved in the wheel circumferential direction X (see FIG. 1) with substantially the same curvature as the curvature of the outer circumferential surface 11d.

The upper plate 25a is curved in the wheel circumferential direction X (see FIG. 1) with a predetermined curvature in such a way as to face the bottom plate 25b while keeping a predetermined distance therefrom.

The side plates 25c rise outward in the wheel radial direction Z from the bottom plate 25b substantially perpendicularly to the outer circumferential surface 11d of the well portion 11c.

These upper plate 25a, bottom plate 25b, and side plates 25c define the sub-air chamber SC inside the main body portion 13 in a manner that surrounds the sub-air chamber SC.

As shown in FIG. 2, the main body portion 13 includes multiple (in the present embodiment, six) bridges 33 aligned in the wheel circumferential direction X. These bridges 33 are aligned in one line extending in the wheel circumferential direction X on a portion of the main body portion 13 located centrally with respect to the length thereof in the wheel width direction Y.

As shown in FIG. 3, each of the bridges 33 of the present embodiment has a circular cylindrical shape and partially connects between the upper plate 25a and the bottom plate 25b. The bridge 33 defines an inner space extending through the main body portion 13 in the wheel radial direction Z to provide an opening with a circular shape in plan view on the upper plate 25a and on the bottom plate 25b. In this inner space of the bridge 33, a cylindrical portion 21 of the later-described joining member 20 is inserted to pass through the main body portion 13 in the wheel radial direction Z.

As shown in FIG. 2, the main body portion 13 includes a housing portion 13a for housing a base plate 22 of the joining member 20 later described.

The housing portion 13a of the present embodiment is formed of a recess for housing the base plate 22, which is formed of a rectangular plate body curved in the wheel circumferential direction X. Specifically, as shown in FIG. 3, the housing portion 13a is a portion of the upper plate 25a of the main body portion 13 that is partially recessed toward the bottom plate 25b by a thickness of the base plate 22 so as to have a shape corresponding to the base plate 22. With this structure, an upper surface of a surrounding portion of the housing portion 13a of the upper plate 25a and an upper surface of the base plate 22 is flush with each other.

Next, a description will be given of the tube body 18 (see FIG. 1).

As shown in FIG. 1, each tube body 18 is formed on a wheel width direction Y one side of a wheel circumferential direction X end of the main body portion 13 so as to project from the main body portion 13 in the wheel circumferential direction X.

As described, the sub-air chamber member 10 of the present embodiment has a shape symmetrical about the partition wall 16 in the wheel circumferential direction X. Thus, although only one tube body 18 is shown in FIG. 1 for the convenience of drawing, the tube bodies 18 of the present embodiment are formed on the main body portion 13 at two end portions thereof located symmetrically opposite to each other in the longitudinal direction (wheel circumferential direction X) so as to form a pair. Note that the pair of tube bodies 18 in the present embodiment are arranged at positions spaced at a substantially 90-degree interval about the wheel axis.

As shown in FIG. 2, a communication hole 18a is formed inside the tube body 18. As shown in FIG. 3, the above-described communication hole 18a allows communication between the sub-air chamber SC formed inside the main body portion 13 and a tire air chamber 9 that is formed above the well portion 11c between the well portion 11c and a tire (not shown).

Joining Member

Next, the joining member 20 (see FIG. 2) is described.

As shown in FIG. 2, the joining member 20 includes the multiple cylindrical portions 21, the above-described base plate 22 on which the cylindrical portions 21 are each integrally formed, and joining portions 23 respectively formed on distal ends of the cylindrical portions 21.

As shown in FIG. 3, each of the cylindrical portions 21 of the present embodiment is formed with an outer diameter substantially equal to an inner diameter of the bridge 33 so as to be closely fitted on an inner side of the bridge 33 and housed therein.

As shown in FIG. 2, the cylindrical portions 21 are aligned correspondingly to the positions of the bridges 33 of the main body portion 13 and have proximal end portions joined to the base plate 22.

Figure 4:
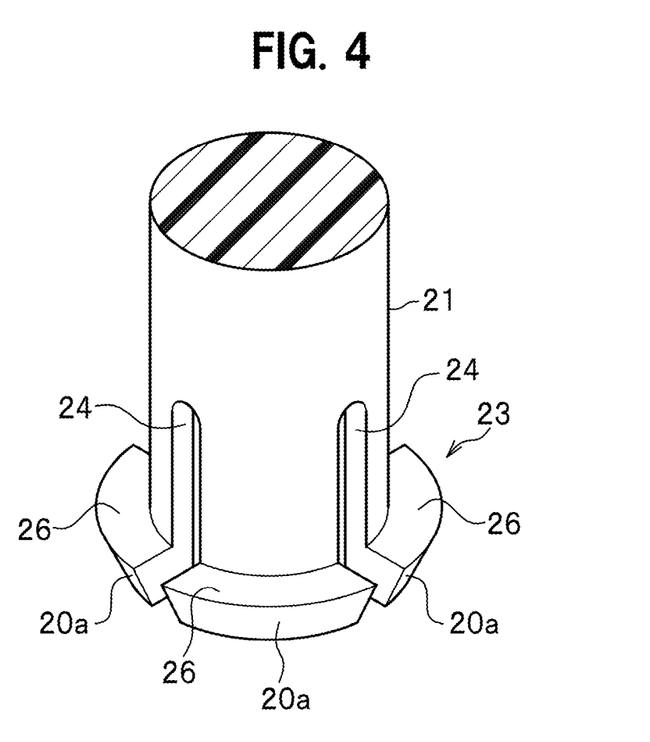
FIG. 4 is a partially enlarged perspective view of a cylindrical portion of the joining member.

FIG. 4 is a partially enlarged perspective view of the cylindrical portion 21.

As shown in FIG. 4, the cylindrical portion 21 has multiple slits 24 formed thereon.

Each of the slits 24 extends in a longitudinal direction (extending direction) of the cylindrical portion 21 substantially from a longitudinal direction central portion to a distal end of the cylindrical portion 21. These slits 24 are formed to be aligned at the same intervals in a circumferential direction of the cylindrical portion 21. The slits 24 of the present embodiment are four slits aligned in the circumferential direction of the cylindrical portion 21; however, the number of the slits 24 is not particularly limited so long as it is two or more. Note that only two of the slits 24 are shown in FIG. 4 for the convenience of drawing and illustration of the other two is omitted.

As shown in FIG. 4, the cylindrical portion 21 has a joining portion 23 formed on the distal end of the cylindrical portion 21.

As shown in FIG. 3, this joining portion 23 is disposed in an enlarged diameter portion 14b of the later-described hole portion 14 formed on the outer circumferential surface 11d of the well portion 11c.

The joining portion 23 of the present embodiment is formed of four flanges 26 extending radially outward respectively from four sections of the distal end portion of the cylindrical portion 21 that are separated from one another by the slits 24. Note that only three of the flanges 26 are illustrated in FIG. 4 for the convenience of drawing and illustration of the remaining one is omitted.

These four flanges 26 and the intervening slits 24 are aligned in the circumferential direction, forming a substantially inverted circular truncated cone profile at the distal end portion of the cylindrical portion 21. In other words, the joining portion 23 formed of the four flanges 26 has a tapered surface 20a on an outer periphery of the joining portion 23 that has a diameter decreasing toward the distal end.

This joining portion 23 divided into four sections in the circumferential direction by the slits 24 has spring elasticity to be able to be deformed in a radial direction of the cylindrical portion 21.

The above-described sub-air chamber member 10 (see FIG. 2) and the joining member 20 (see FIG. 2) according to the present embodiment are, for example, resin molded products; however, they are not limited thereto and may be made of another material such as a metal. Note that, when they are made of a resin, it is preferable to employ a light resin having high rigidity that can be used for blow molding and injection molding, taking into account weight reduction, productivity improvement, production-cost reduction, keeping the airtightness of the sub-air chamber SC (see FIG. 3), and the like. In particular, polypropylene, polyamide, or the like is preferred.

Next, a description will be given of the hole portion 14 (see FIG. 3). The hole portion 14 corresponds to the "recessed portion" in the claims.

As shown in FIG. 3, the hole portion 14 includes a constricted portion 14a having substantially the same diameter as that of the cylindrical portion 21 of the joining member 20, and the enlarged diameter portion 14b which has a larger outer diameter than the constricted portion 14a and into which the joining portion 23 of the joining member 20 fits.

The constricted portion 14a defines an axially thin cylindrical space corresponding to the profile of the distal end portion of the cylindrical portion 21. The enlarged diameter portion 14b defines a space with an inverted circular truncated cone shape corresponding to the profile of the joining portion 23.

Figure 5:
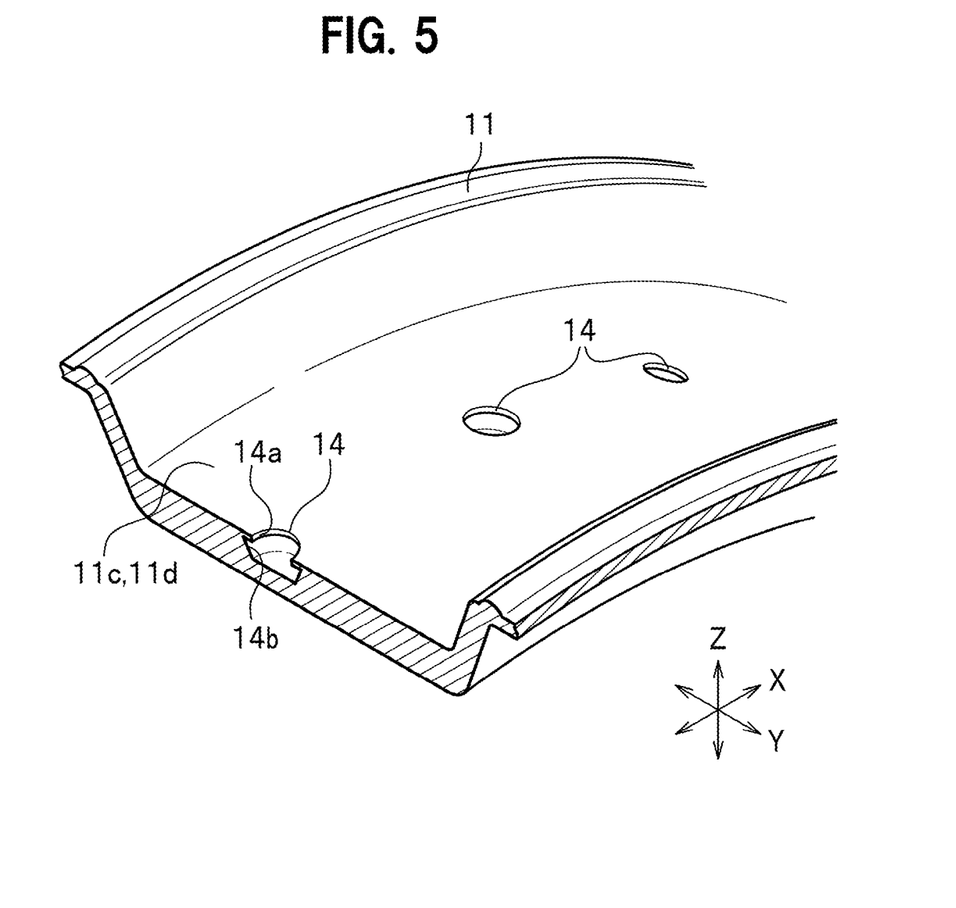
FIG. 5 is an explanatory diagram for explaining the configuration of a recessed portion formed on an outer circumferential surface of a well portion.

FIG. 5 is an explanatory diagram for explaining the configuration of the hole portions 14 (recessed portions) formed on the outer circumferential surface 11d of the well portion 11c.

As shown in FIG. 5, the hole portions 14 are formed on the rim 11 in such a way that each hole portion 14 defines an opening on the outer circumferential surface 11d of the well portion 11c.

These hole portions 14 are formed at positions respectively corresponding to the joining portions 23 of the above-described joining member 20 (see FIGS. 2 and 3). In other words, the hole portions 14 are aligned in a line in the wheel circumferential direction X on a portion of the outer circumferential surface 11d of the well portion 11c that is located centrally with respect to the length of the outer circumferential surface 11d in the wheel width direction Y (see FIG. 5), in such a way that the hole portions 14 respectively correspond to the bridges 33 (see FIGS. 2 and 3).

In FIG. 5, the reference sign 14a indicates the constricted portion, and the reference sign 14b indicates the enlarged diameter portion.

This hole portion 14 may be, for example, formed by 0; however, the method of forming the hole portion 14 is not particularly limited.

Method of Attaching Sub-Air Chamber Member

Next, a method of attaching the sub-air chamber member 10 to the outer circumferential surface 11d of the well portion 11c will be described with reference to FIGS. 2 to 4.

In this attaching method, first, the cylindrical portions 21 of the joining member 20 are respectively inserted in the bridges 33 of the sub-air chamber member 10 (see FIG. 2). In this process, each of the cylindrical portions 21 is elastically deformed in such a way that the widths of the slits 24 (see FIG. 4) become narrower and the outer diameter of the joining portion 23 (see FIG. 4) decreases to become equal to the inner diameter of the corresponding bridge 33.

When the cylindrical portion 21 has passed through the sub-air chamber member 10 and the joining portion 23 of the cylindrical portion 21 has passed through the constricted portion 14a of the hole portion 14 and reached the enlarged diameter portion 14b of the hole portion 14 (see FIG. 3), the outer diameter of the joining portion 23 is restored by the spring elasticity thereof. As a result, the joining portion 23 is fitted in the enlarged diameter portion 14b of the hole portion 14. The flange 26 (see FIG. 3) is locked by the constricted portion 14a.

The base plate 22 of the joining member 20 is fitted in the housing portion 13a of the sub-air chamber member 10 (see FIG. 3).

In this way, the sub-air chamber member 10 is attached to the outer circumferential surface 11d of the well portion 11c via the joining member 20 (see FIG. 3), and the series of processes of the attaching method is finished.

Operations and Advantageous Effects

Next, a description will be given of operations and advantageous effects of the vehicle wheel 1 according to the present embodiment.

Figure 6A:
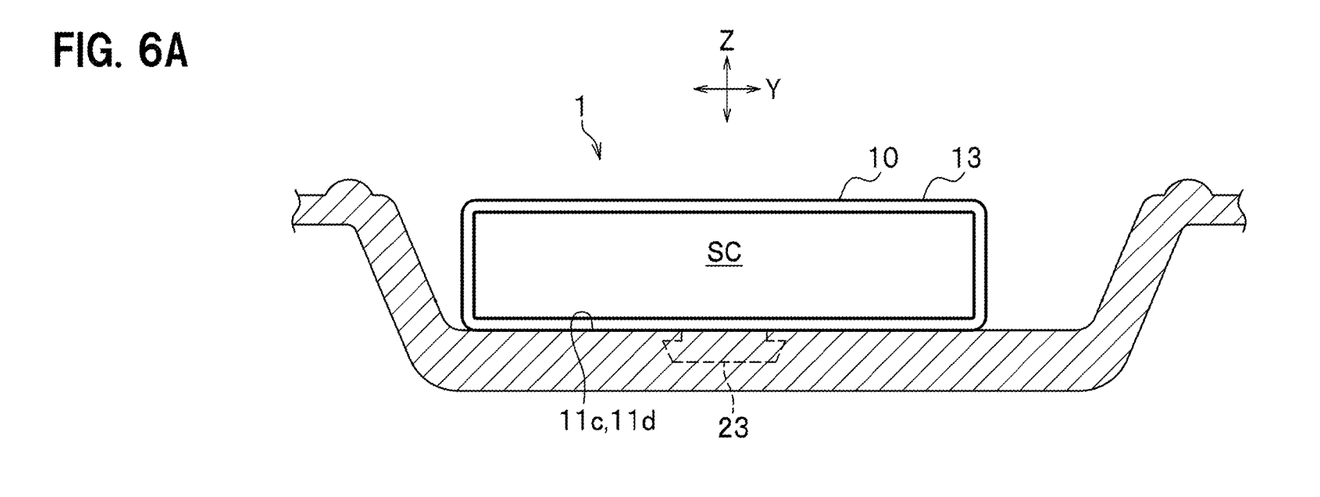
FIG. 6A is a schematic diagram for describing the operations and advantageous effects of the vehicle wheel according to the embodiment of the present invention.
Figure 6B:
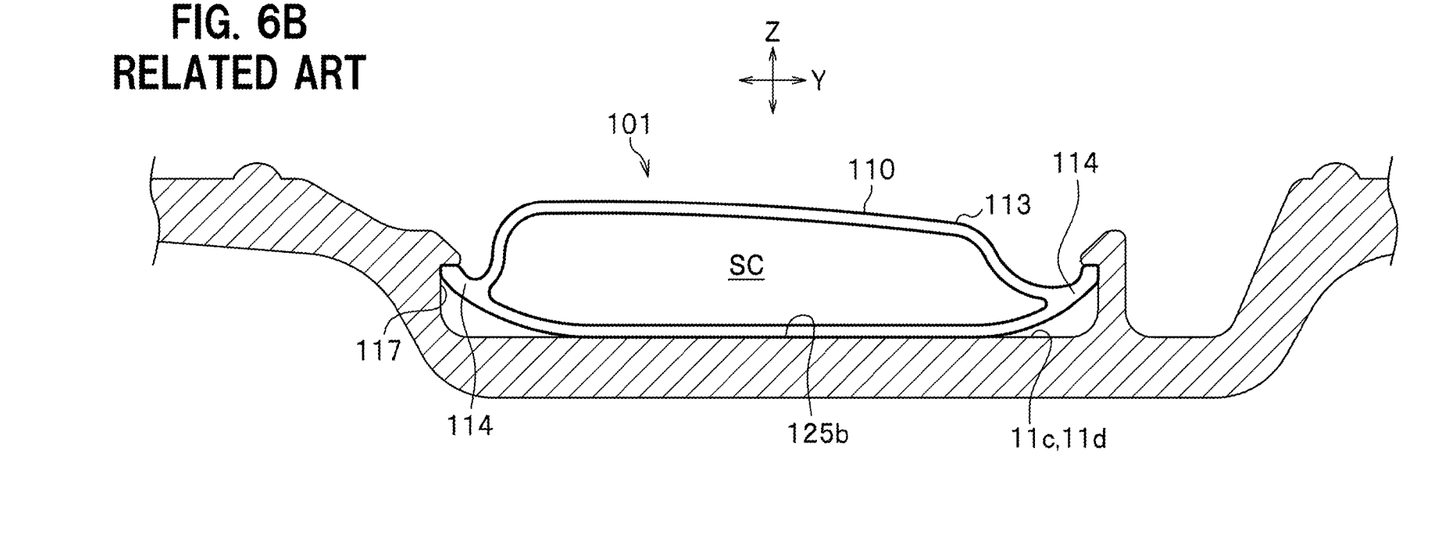
FIG. 6B is a schematic diagram of a vehicle wheel indicated as a reference example.

FIG. 6A is a schematic diagram for explaining the operations and advantageous effects of the vehicle wheel 1 according to the embodiment of the present invention. FIG. 6B is a schematic diagram of a vehicle wheel 101 indicated as a reference example.

First, a description will be given of a configuration of the wheel 101 indicated as the reference example.

As shown in FIG. 6B, the wheel 101 indicated as the reference example has a sub-air chamber member 110 including a main body portion 113 and a pair of edge portions 114 each formed in a plate body extending from the main body portion 113 in the wheel width direction Y. The edge portions 114 each have an extended tip end portion fitted and locked in a groove portion 117 formed on a well portion 11c.

The wheel 101 has a problem in that the size of the main body portion 113 in the wheel width direction Y is limited by the extending edge portions 114. Thus, in the wheel 101, the volume of the sub-air chamber SC formed in the main body portion 113 is also limited.

In contrast, the sub-air chamber member 10 of the vehicle wheel 1 according to the present embodiment is attached to the outer circumferential surface 11d of the well portion 11c via the joining portion 23 as shown in FIG. 6A.

Thus, unlike the wheel 101 indicated in FIG. 6B as a reference example, the sub-air chamber member 10 of the vehicle wheel 1 need not have an edge portion like the edge portions 114 (see FIG. 6B) for attaching the sub-air chamber member 110 to the well portion 11c of the wheel 101. That is, the vehicle wheel 1 is not limited by an edge portion like the edge portions 114 (see FIG. 6B) as to the size of the main body portion 13 in the wheel width direction Y.

With this vehicle wheel 1, it is possible to provide a sub-air chamber SC with a large volume and to further improve the noise canceling performance of the road noise.

As shown in FIG. 3, the sub-air chamber member 10 of the vehicle wheel 1 according to the present embodiment has a strength improved by the cylindrical bridges 33 formed between the upper plate 25a and the bottom plate 25b. The cylindrical portions 21 of the joining member 20 of the vehicle wheel 1 respectively extend inside the bridges 33.

With this structure of the vehicle wheel 1, it is possible to support the sub-air chamber member 10 on the well portion 11c by the joining member 20 at portions of sub-air chamber member 10 that are enhanced in rigidity with the bridges 33.

This vehicle wheel 1 efficiently uses the inner spaces of the bridges 33, which could be dead spaces, as spaces for arranging the joining member 20 (cylindrical portions 21).

The cylindrical portions 21 of the vehicle wheel 1 according to the present embodiment are respectively arranged in the bridges 33 aligned in the wheel circumferential direction X of the sub-air chamber member 10, and are respectively locked in the hole portions 14 of the well portion 11c. These cylindrical portions 21 are each integrally joined to the base plate 22 housed in the housing portion 13a that is formed on an upper surface of the sub-air chamber member 10 and extends in the wheel circumferential direction X. Therefore, the cylindrical portions 21 are interconnected with one another via the base plate 22.

With this vehicle wheel 1, when a centrifugal force generated due to the rotation of the wheel works on the sub-air chamber member 10, the sub-air chamber member 10 can be effectively held on the outer circumferential surface 11d of the well portion 11c in such a way that the coupling force between the base plate 22 and the well portion 11c resists the centrifugal force via the surface of the base plate 22 that extends on the upper surface of the sub-air chamber member 10.

According to the structure of the vehicle wheel 1 of the present embodiment, the sub-air chamber member 10 is supported on the rim 11 by the joining member 20 whose joining portions 23 are fitted in the hole portions 14 (recessed portions) formed on the outer circumferential surface 11d of the well portion 11c.

With this structure of the vehicle wheel 1, the sub-air chamber member 10 is attached to well portion 11c more easily than when the sub-air chamber member 10 is attached to the well portion 11c by welding, adhering, fastening, or the like.

Although an embodiment of the present invention has been described above, the present invention is not limited to the embodiment described above and can be carried out in various modes.

The hole portion 14 of the above-described embodiment, which corresponds to a "recessed portion" of the claims, has been described as having the constricted portion 14a and the enlarged diameter portion 14b. However, the hole portion 14 is not limited thereto.

Figure 7A:
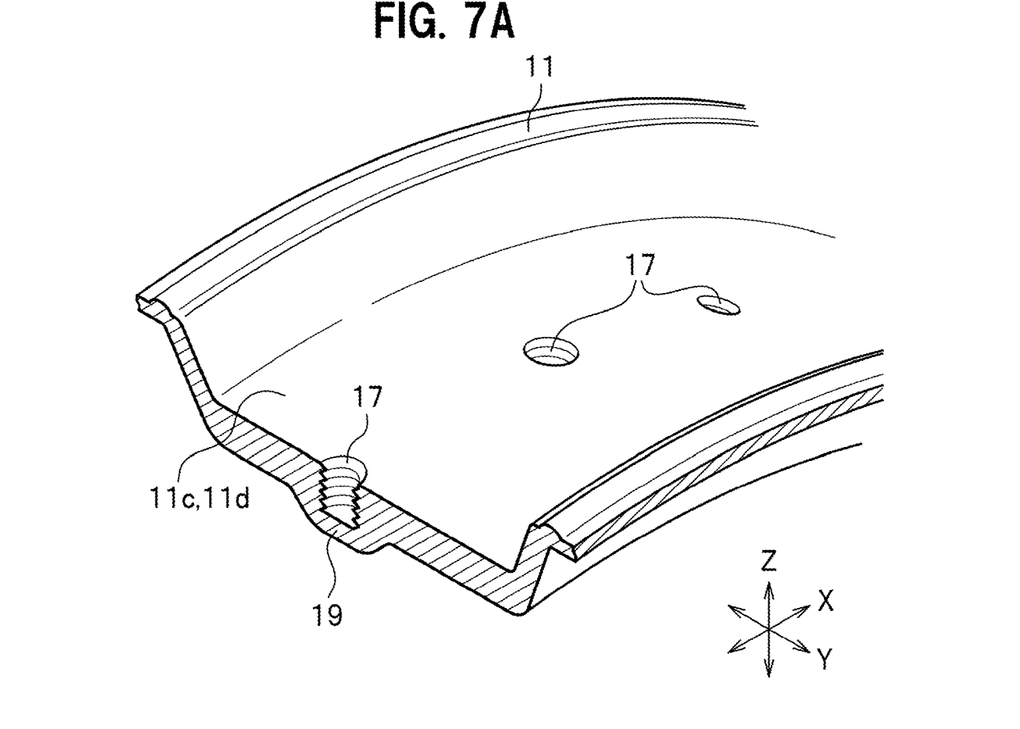
FIG. 7A is a partial cross-sectional perspective view of a rim with a first modification of the recessed portion that is formed on the outer circumferential surface of the well portion.
Figure 7B:
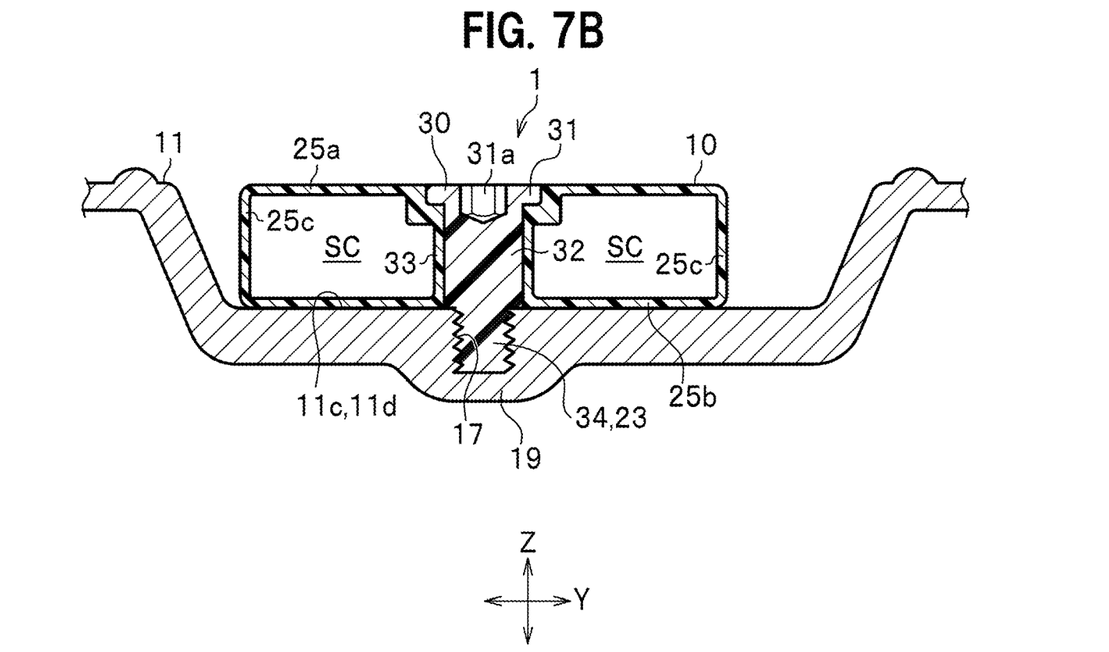
FIG. 7B is a cross-sectional view of a vehicle wheel that includes a joining member that joins to the recessed portion according to the first modification shown in FIG. 7A.
Figure 8A:
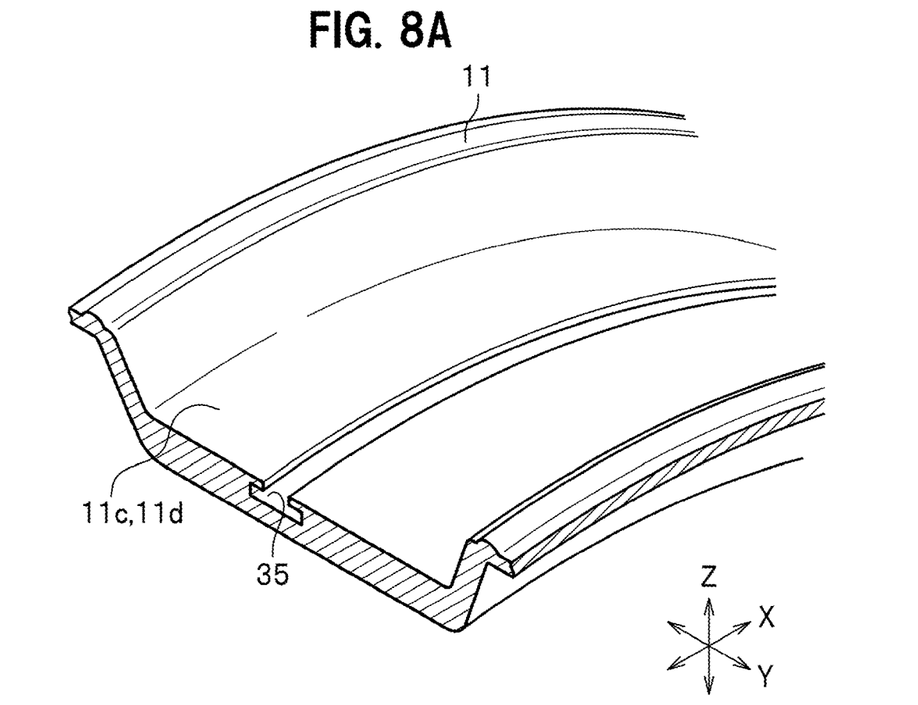
FIG. 8A is a partial cross-sectional perspective view of a rim with a second modification of the recessed portion formed on the outer circumferential surface of the well portion.
Figure 8B:
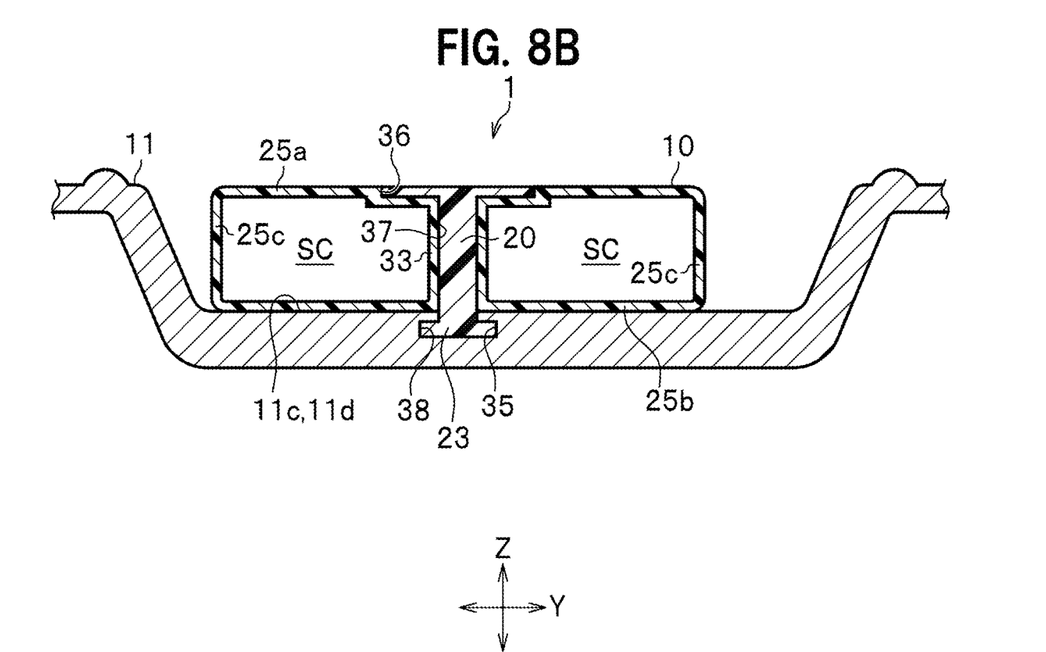
FIG. 8B is a cross-sectional view of a vehicle wheel that includes a joining member that joins to the recessed portion according to the second modification shown in FIG. 8A.

FIG. 7A is a partial cross-sectional perspective view of a rim 11 with a first modification of the "recessed portion" formed on the outer circumferential surface 11d of the well portion 11c. FIG. 7B is a cross-sectional view of the vehicle wheel 1 that includes a joining member 20 that joins to the "recessed portion" according to the first modification shown in FIG. 7A. FIG. 8A is a partial cross-sectional perspective view of a rim 11 with a second modification of the "recessed portion" formed on the outer circumferential surface 11d of the well portion 11c. FIG. 8B is a cross-sectional view of the vehicle wheel 1 that includes a joining member 20 that is joined to the "recessed portion" according to the second modification shown in FIG. 8A.

Note that constituent elements shown in FIGS. 7A, 7B, 8A and 8B which are the same as those in the above-described embodiment are denoted by the same reference signs and detailed descriptions thereof will be omitted.

As shown in FIG. 7A, the recessed portion according to the first modification is formed of a threaded hole 17. This threaded hole 17 can be formed by threading a hole formed on the outer circumferential surface 11d of the well portion 11c.

In FIG. 7A, the reference sign 19 indicates a thickened portion. The thickened portion 19 is, for example, a portion formed during casting the wheel. A longer threaded hole 17 can be formed by providing such a thickened portion 19 below (on an inner side in the wheel radial direction Z of) the threaded hole 17 (recessed portion); however, this is not a requirement of the configuration with the threaded hole 17.

As shown in FIG. 7B, the vehicle wheel 1 having the threaded holes 17 as the recessed portions has a modification of the joining member 20 which is constituted by screw members 30 each including, instead of the joining portion 23, a threaded portion 34 that is able to be thread engaged with the corresponding threaded hole 17.

Specifically, each screw member 30 includes a head portion 31 having a hexagon socket 31a engageable with a fastening tool (not shown), a body portion 32 inserted in the bridge 33, and the above-described threaded portion 34.

This screw member 30 is, for example, a resin molded product; however, it may be made of a metal.

With this vehicle wheel 1, it is possible to attach the sub-air chamber member 10 more tightly to the outer circumferential surface 11d of the well portion 11c by adjusting the fastening of the screw members 30.

Although illustration is omitted, the vehicle wheel 1 shown in FIG. 7B may have a metal washer formed of a plate body extending in the wheel circumferential direction X on the upper surface of the sub-air chamber member 10 and arranged between the head portions 31 of the screw members 30 and the sub-air chamber member 10.

This metal washer includes insertion holes for the screw members 30 at positions corresponding to the multiple bridges 33. This metal washer can provide similar advantageous effects as those provided by the above-described base plate 22 of the joining member 20 (see FIG. 2) when the screw members 30 have been fastened to the hole portions 14.

As shown in FIG. 8A, the recessed portion according to the second modification is formed of a T-groove 35. This T-groove 35 may be a dovetail groove. This T-groove 35 or dovetail groove (hereinafter referred to as T-groove 35 or the like) is formed by groove cutting milling for example; however, it is not limited thereto.

This T-groove 35 or the like is formed to extend in the wheel circumferential direction X to continue to the corresponding lower openings of the multiple bridges 33.

As shown in FIG. 8B, the vehicle wheel 1 including the T-groove 35 or the like serving as the recessed portion has a joining member 20 formed of a cured resin filled in the bridges 33 and the T-groove 35 or the like.

More specifically, the joining member 20 is obtained by filling a first space 36 corresponding to the housing portion 13a (see FIG. 2) of the above embodiment, a second space 37 inside the bridges 33, and a third space 38 defined by the T-groove 35 or the like with a melted thermoplastic resin, and then curing the thermoplastic resin.

The joining portion 23 that is formed of the cured resin and joins the sub-air chamber member 10 to the well portion 11c is molded in the T-groove 35 or the like (recessed portion) of the vehicle wheel 1.

Unlike the vehicle wheel 1 (see FIG. 3) according to the above embodiment, this structure of the vehicle wheel 1 eliminates the need of obtaining the joining member 20 with the joining portions 23 as a separate molded product. Thus, according to the structure of this vehicle wheel 1, it is possible to simplify the production process of the vehicle wheel 1.

According to the structure of the vehicle wheel 1 shown in FIG. 8B, the cured resin filled in the first space 36, the second space 37 in the multiple bridges 33, and the third space 38 has been integrally molded in the spaces, and thus the cured resin is continuously formed.

This allows the vehicle wheel 1 to more effectively hold the sub-air chamber member 10 on the outer circumferential surface 11d of the well portion 11c.

What is claimed is:

1. A vehicle wheel, comprising:
   a rim including a well portion with an outer circumferential surface, the well portion having a recessed portion formed on the outer circumferential surface;
   a sub-air chamber member serving as a Helmholtz resonator; and
   a joining member separate from the rim and the sub-air chamber member and including a joining portion disposed in the recessed portion,
   wherein the sub-air chamber member comprises a bottom plate disposed on the outer circumferential surface of the well portion, and the joining member directly attaches the bottom plate of the sub-air chamber member to the outer circumferential surface of the well portion.

2. The vehicle wheel according to claim 1,
   wherein the sub-air chamber member further comprises:
   an upper plate that together with the bottom plate forms a sub-air chamber between the upper plate and the bottom plate; and
   a bridge located centrally in the sub-air chamber in a wheel width direction, the bridge having a circular cylindrical shape and connecting between the bottom plate and the upper plate, and wherein the joining member extends in the bridge.

3. The vehicle wheel according to claim 1,
   wherein the joining portion is formed of a cured resin cured and molded in the recessed portion by filling the recessed portion with a melted thermoplastic resin and then curing the thermoplastic resin.

4. The vehicle wheel according to claim 1,
   wherein the recessed portion is a threaded hole, and
   wherein the joining member is a screw member having, as the joining portion, a threaded portion engaged with the threaded hole.

* * * * *